United States Patent
Asena et al.

(10) Patent No.: US 10,394,903 B2
(45) Date of Patent: Aug. 27, 2019

(54) HIGHLY SCALABLE APPLICATION SERVICES

(71) Applicant: SAP SE, Walldorf (DE)

(72) Inventors: Tugba Bodrumlu Asena, Istanbul (TR); Ecem Unal, Izmir (TR); Hasan Turken, Ankara (TR); Joachim Fitzer, Schriesheim (DE); Reinhold Kautzleben, Karlsruhe (DE)

(73) Assignee: SAP SE, Walldorf (DE)

( * ) Notice: Subject to any disclaimer, the term of this patent is extended or adjusted under 35 U.S.C. 154(b) by 237 days.

(21) Appl. No.: 15/331,489

(22) Filed: Oct. 21, 2016

(65) Prior Publication Data

US 2018/0115614 A1    Apr. 26, 2018

(51) Int. Cl.
  *G06F 16/951* (2019.01)
  *H04L 29/08* (2006.01)
  *G06F 16/958* (2019.01)

(52) U.S. Cl.
  CPC ......... *G06F 16/951* (2019.01); *G06F 16/958* (2019.01); *H04L 67/16* (2013.01)

(58) Field of Classification Search
  CPC . G06F 17/30864; G06F 17/3089; H04L 67/16
  See application file for complete search history.

(56) References Cited

U.S. PATENT DOCUMENTS

| | | | |
|---|---|---|---|
| 8,924,472 B1 * | 12/2014 | Luciani | G06F 17/30194 709/203 |
| 9,667,725 B1 * | 5/2017 | Khanduja | G06F 9/45558 |
| 9,780,952 B1 * | 10/2017 | Behm | H04L 9/3247 |
| 2009/0013029 A1 * | 1/2009 | Childress | H04L 67/1095 709/203 |
| 2012/0072985 A1 * | 3/2012 | Davne | H04L 63/0272 726/22 |
| 2014/0006578 A1 * | 1/2014 | Kohn | H04L 67/1027 709/223 |
| 2014/0122724 A1 * | 5/2014 | Zhang | H04L 49/70 709/226 |
| 2014/0359700 A1 * | 12/2014 | Krieger | H04L 63/166 726/3 |
| 2015/0067170 A1 * | 3/2015 | Zhang | H04L 47/70 709/226 |
| 2017/0111446 A1 * | 4/2017 | Rivera | H04L 67/1008 |

* cited by examiner

*Primary Examiner* — Joe Chacko
(74) *Attorney, Agent, or Firm* — Jones Day

(57) ABSTRACT

Execution of a plurality of application services corresponding to a plurality of user sessions are initiated in a distributed computing environment. Thereafter, all functional units of each application service are executed as part of a node of the distributed computing environment in a separate service environment and without remote calls to other services. Subsequently, each user session is executed in a separate and distinct node of the distributed computing environment. Related apparatus, systems, techniques and articles are also described.

15 Claims, 4 Drawing Sheets

HIGHLY SCALABLE APPLICATION SERVICES

TECHNICAL FIELD

The subject matter described herein relates to a highly scalable computing environment concurrently executing a plurality of application services.

BACKGROUND

The need for large scale computing systems continues to increase as enterprises are generating and consuming greater amounts data. This need is especially true for enterprises providing access to data by large numbers of concurrent user sessions. As computing systems scale to handle the load required for processing numerous concurrent user sessions, so does the complexity of such systems. This complexity can be due, in part, to the interrelationship amongst various services executed by the system in response to user requests and the like. Execution of these services can require significant processing resources and given their related nature, crashed processes of one user often affect processes of other users (i.e., the other processes can also crash).

SUMMARY

In a first aspect, execution of a plurality of application services corresponding to a plurality of user sessions are initiated in a distributed computing environment. Thereafter, all functional units of each application service are executed as part of a node of the distributed computing environment in a separate service environment and without remote calls to other services. Subsequently, each user session is executed in a separate and distinct node of the distributed computing environment.

Execution of the application services can be orchestrated by an application server in communication with each of the plurality of nodes.

The respective service environments can provide access to service configurations for at least a portion of the services and access to interfaces of other services for inter-service interaction.

The services can be shared services and/or application specific services. At least a portion of the shared services and/or application specific services can be obtained by the application server from a service registry.

At least a portion of the application services can be written in the GO programming language.

The distributed computing environment can include an in-memory query engine. The in-memory query engine can be coupled to and provide access to an in-memory database. The in-memory query engine can be coupled to and provide access to a cluster computing framework.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a highly scalable environment to enable self-contained computing nodes to be added to a distributed computing environment without minimal configuration and orchestration costs. These additional nodes, in turn, increase the computing capacity of such an environment to allow for additional concurrent user sessions to be executed. Moreover, the current subject matter is advantageous in that it provides for stronger isolation of user sessions. Running a separate process for each user leads to a higher overall stability such that a crashing process affects only a single user as opposed to multiple or all users. The current subject matter can also reduce network communications required while processing a request.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
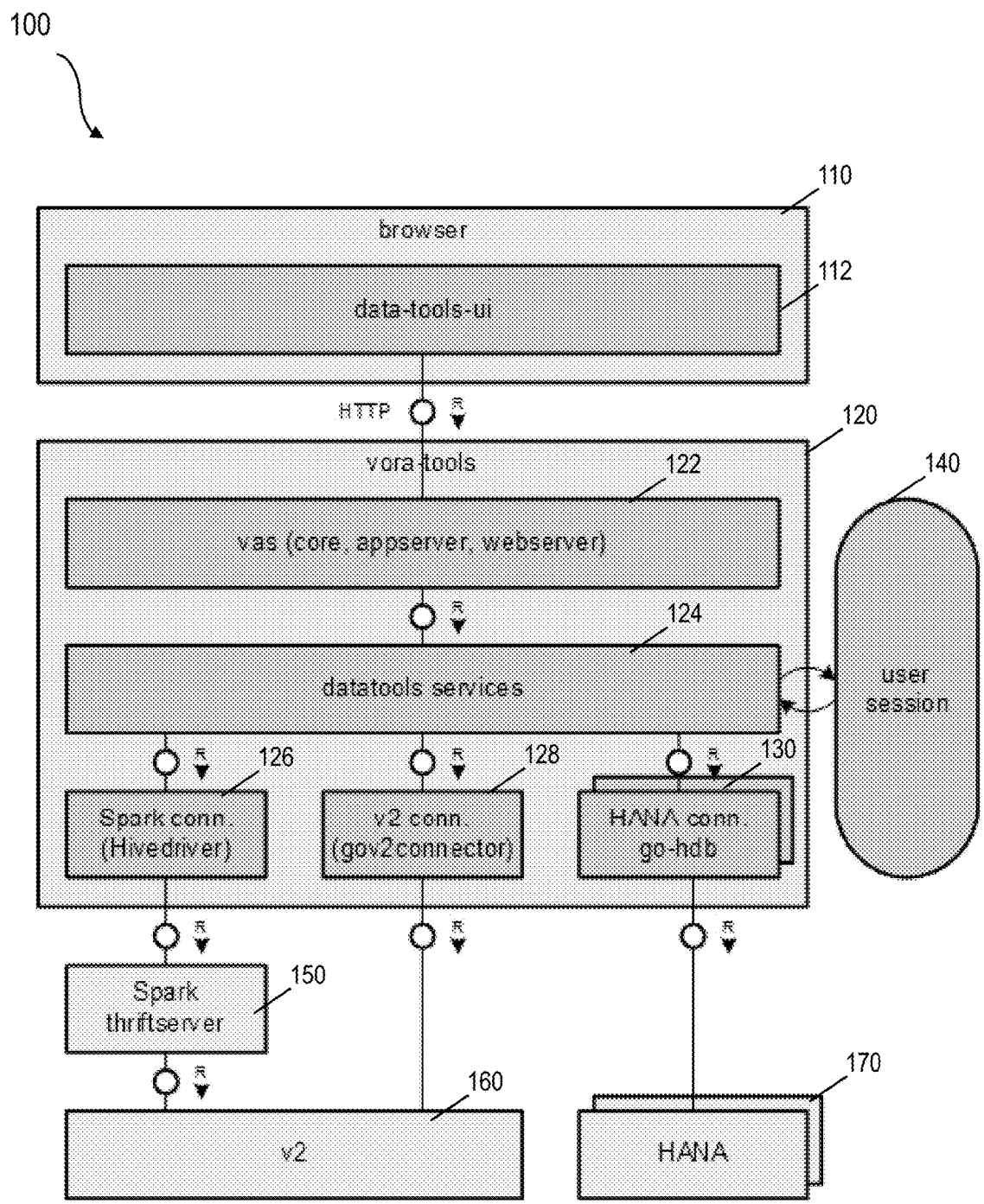
FIG. 1 is a computing system architecture diagram for providing real-time data access and enriched interactive analytics.

FIG. 1 is a computing system architecture diagram 100 providing real-time data access as well as enriched interactive analytics that can be used to implement highly scalable applications/services as provided herein. With this arrangement, a client computing device 110 interacts with an in-memory query engine 120 that in turn, provides selective access to data sources such as a cluster computing framework 160 (e.g., APACHE SPARK HIVE server, etc.) and an in-memory database platform (e.g., SAP HANA, etc.). The client 110 can have access to the in-memory query engine 120 via various protocols including HTTP and can render a browser 112 in a user interface layer that, in turn, can visualize various data tools for querying either of the data sources 160, 170. These data tools can allow application developers to model and test their data schema using the data sources 160, 170 (e.g., SAP HANA VORA platform, etc.).

The in-memory query engine 120 can provide shared application services 122 (core, appserver, webserver, etc.) that are reusable across different application services and it can provide various application specific services 124 (e.g., datatools, etc.). The application specific service 124 can depend on the shared services 122; namely, the application specific service 124 can rely on the webserver to provide http/https access to the services needed by the user interface 112 rendered at the client 110. The application specific services 124 can also interact with resources outside of a node (process) such as the data sources 160, 170 as well as data specific to a particular user session 140. The shared application services 122 and the application specific services 124 can be written in the GO programming language and can be available on various operating systems including: WINDOWS, IOS and LINUX.

In addition, there can be various connectors 126, 128, 130 forming part of the in-memory query engine 120 that can allow for access to one or more of the data sources 160, 170. For example, connector 126 can take the form of a SPARK connector (e.g., APACHE HIVEDRIVER, ODBC/JDBC driver, etc.) which in turn interacts with an intermediate server 150 (e.g., a SPARK thriftserver, etc.) that is coupled to data source 160. In addition, there can be a connector 130 that is specifically adapted for accessing data within data source 170 (e.g., an in-memory connector adaptor communicating in the GOA protocol).

While FIG. 1 illustrates the datatool services 124 servicing a single user session 140, it will be appreciated that the in-memory query engine 120 can serve multiple (i.e., processes, etc.). running at the same time, serving different user sessions in parallel. Nodes executing the shared services 122, application specific services 124, and connectors 126-130 can share the same configuration and share the same external resources such as user management (not illustrated) and database instances. The connections to the external resources can be established using drivers/connectors specific for the particular resource. Drivers/connectors are typically not characterized as services, but rather, software packages or libraries compiled into the application.

Figure 2:
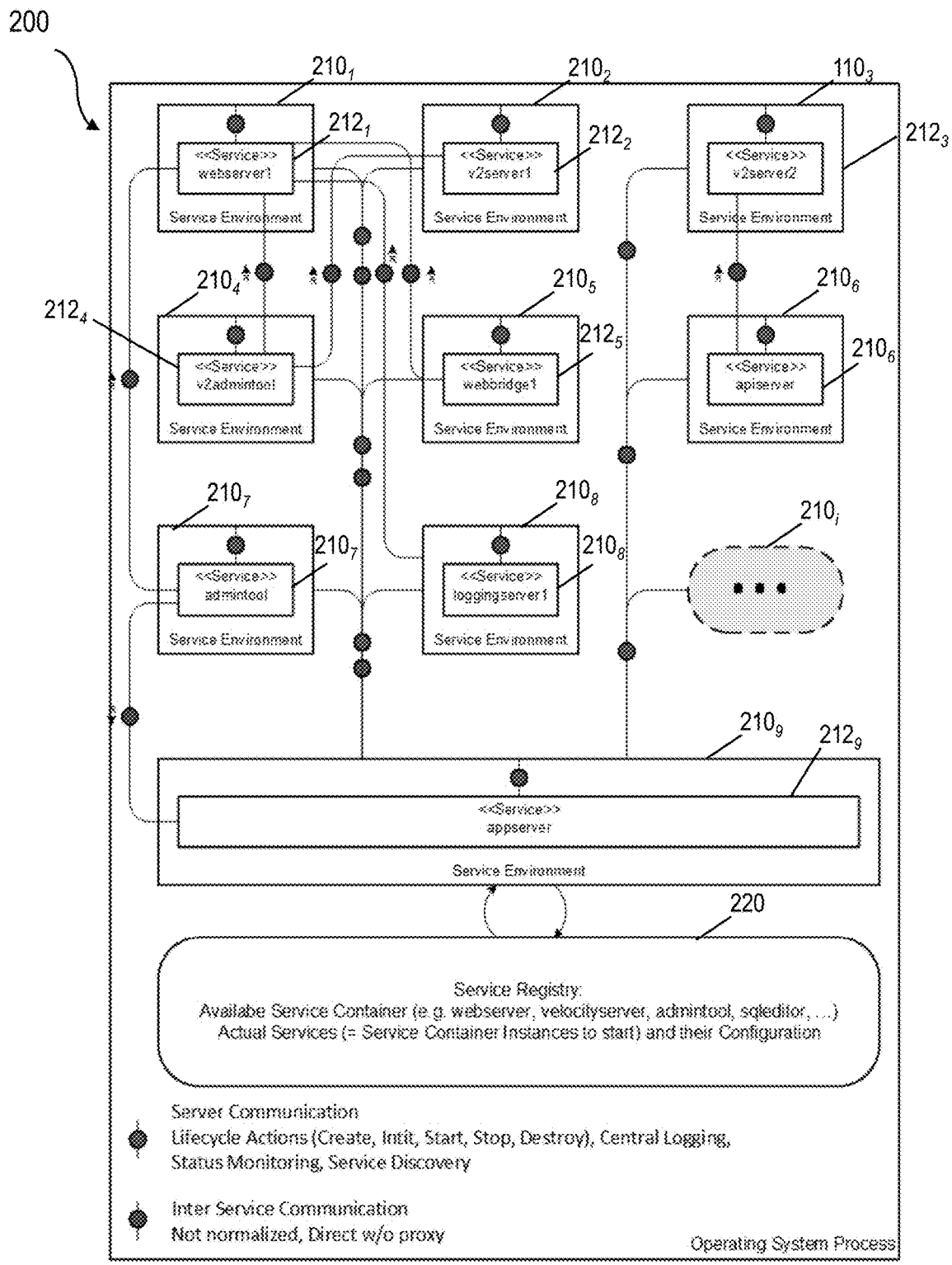
FIG. 2 is a diagram illustrating an operating system process.

FIG. 2 is a diagram 200 illustrating operating system processes for implementing the VAS 122. This operating system process can be implemented by each of a plurality of nodes $210_1 \ldots 210_n$, that each execute a separate service $212_1 \ldots 212_n$. The VAS 122 can be implemented such that functional units of the application (services) can be executed within the same process. With this arrangement, remote calls are not required which is in contrast to conventional micro services architectures.

Scalability is achieved by running each user session in a separate node (aka process) $210_1 \ldots 210_n$. This arrangement provides for stronger isolation of user sessions. It can also reduce network communication when processing a request. Running a separate process for each user leads to a higher overall stability, e.g. a crashing process effects only a single user as opposed to multiple or all users.

By using various operating system and virtualization technologies, the nodes $210_1 \ldots 210_n$ can be dynamically composed according to the functional needs of the application and the workload. This composing can be accomplished, for example, by a special node, by controlling consumption of resources (CPU, memory, disk space, etc.) and/or at the request of an arbitrary node $210_1 \ldots 210_n$ (e.g., a webserver service to create a service for a new user, etc.).

The inner runtime structure of a node $210_1 \ldots 210_n$ can include running services $212_1 \ldots 212_n$ which can be configured individually and interact with each other. A node $210_1 \ldots 210_n$ can retrieve its configuration (which comprises also the configuration of services) from a file system or the node $210_1 \ldots 210_n$ can be pointed to a key value store (e.g. etcd or Consul). A node $210_1 \ldots 210_n$ can be started or even reconfigured at runtime with a set of individually configured services. With reference to FIG. 2, webserver1 $212_1$ (executed by node $210_1$) and loggingserver1 $212_8$ (executed by node $210_8$) are examples of shared services, whereas v2server1 $212_2$ (executed by node $210_2$), apiserver $212_6$ (executed by node $210_6$) and admintool $212_7$ (executed by node $210_7$) are application specific services.

Each service $212_1 \ldots 212_n$ can run in its own service environment. The service environment can provide access the service configuration and other interfaces of other services, the service $212_1 \ldots 212_n$ needs to interact with. Other services $212_1 \ldots 212_n$ outside of a corresponding environment can be discovered and called directly. Stated differently, there can be inter service communications that need not be normalized and can be called without a proxy. Example inter-service communications in this example include those between service $212_1$ to $212_4$, $212_1$ to $212_5$, $212_1$ to $212_7$, $212_1$ to $212_8$, $212_2$ to $212_4$, $212_3$ to $212_6$, and $212_7$ to $212_9$. Node $210_9$ can provide a dedicated appserver service $210_9$ that manages the lifecycle of other services $212_1 \ldots 212_n$ (eg.g., create, init, start, stop, destroy, central logging, status monitoring, service discovery, etc.) and their dependencies by utilizing a service registry 220. The service registry 220 can provide various information such as available service registries (e.g., webserver, admintool, sql editor, etc.) and it can provide information about actual services such as service container instances to start and their configuration. The landscape service can be a client to a service registry which fulfills high availability demands of a cluster. The landscape service can be, for example, be a consul or zookeeper.

Figure 3:
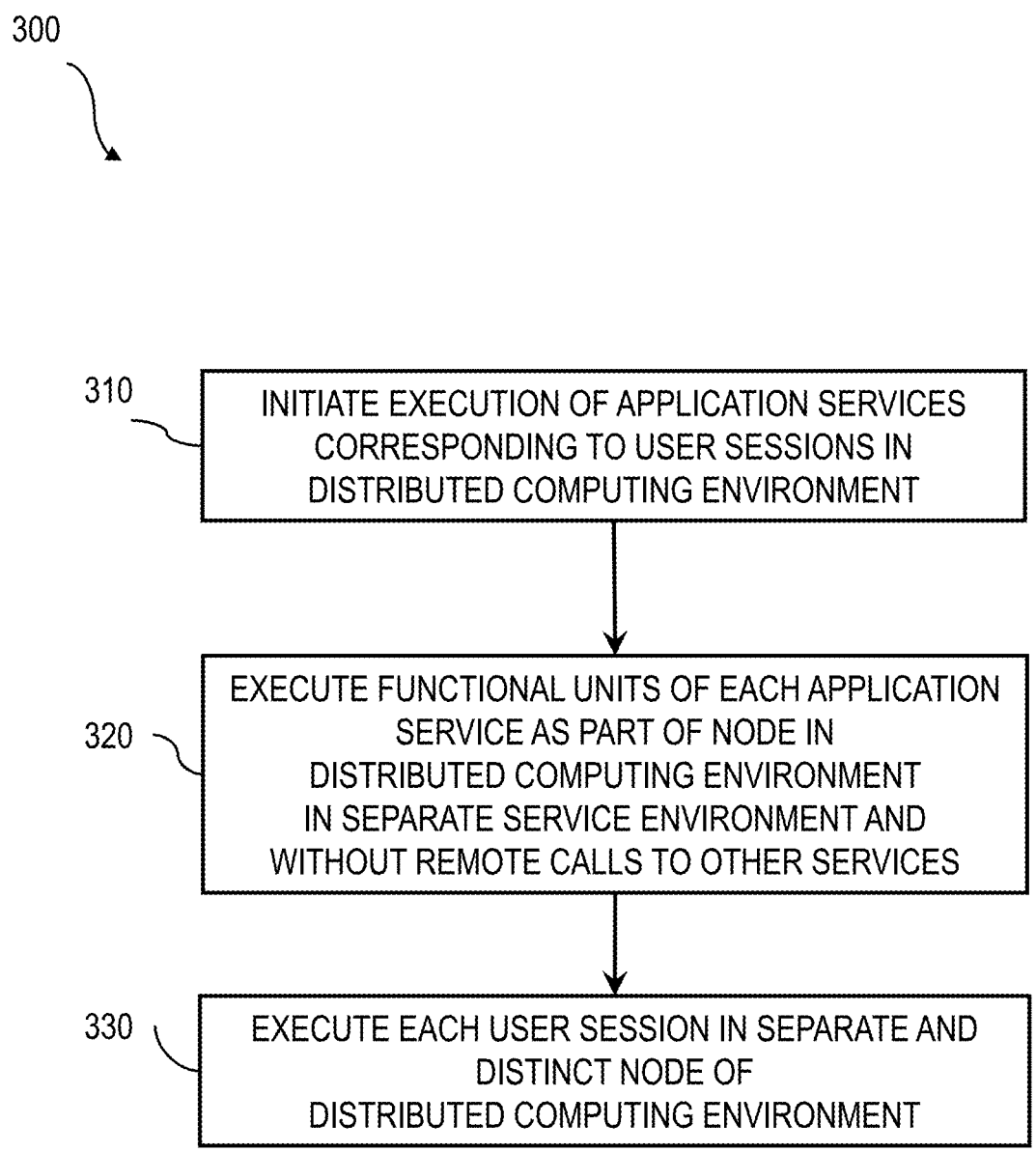
FIG. 3 is a process flow diagram illustrating execution of an application in a highly scalable environment.

FIG. 3 is a process flow diagram illustrating the provision of highly scalable application services. Initially, at 310, execution of a plurality of application services corresponding to a plurality of user sessions is initiated in a distributed computing environment. Thereafter, at 320, all functional units of each application service are executed as part of a node of the distributed computing environment in a separate service environment and without remote calls to other services. In addition, at 330, each user session is executed in a separate and distinct node of the distributed computing environment.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 4:
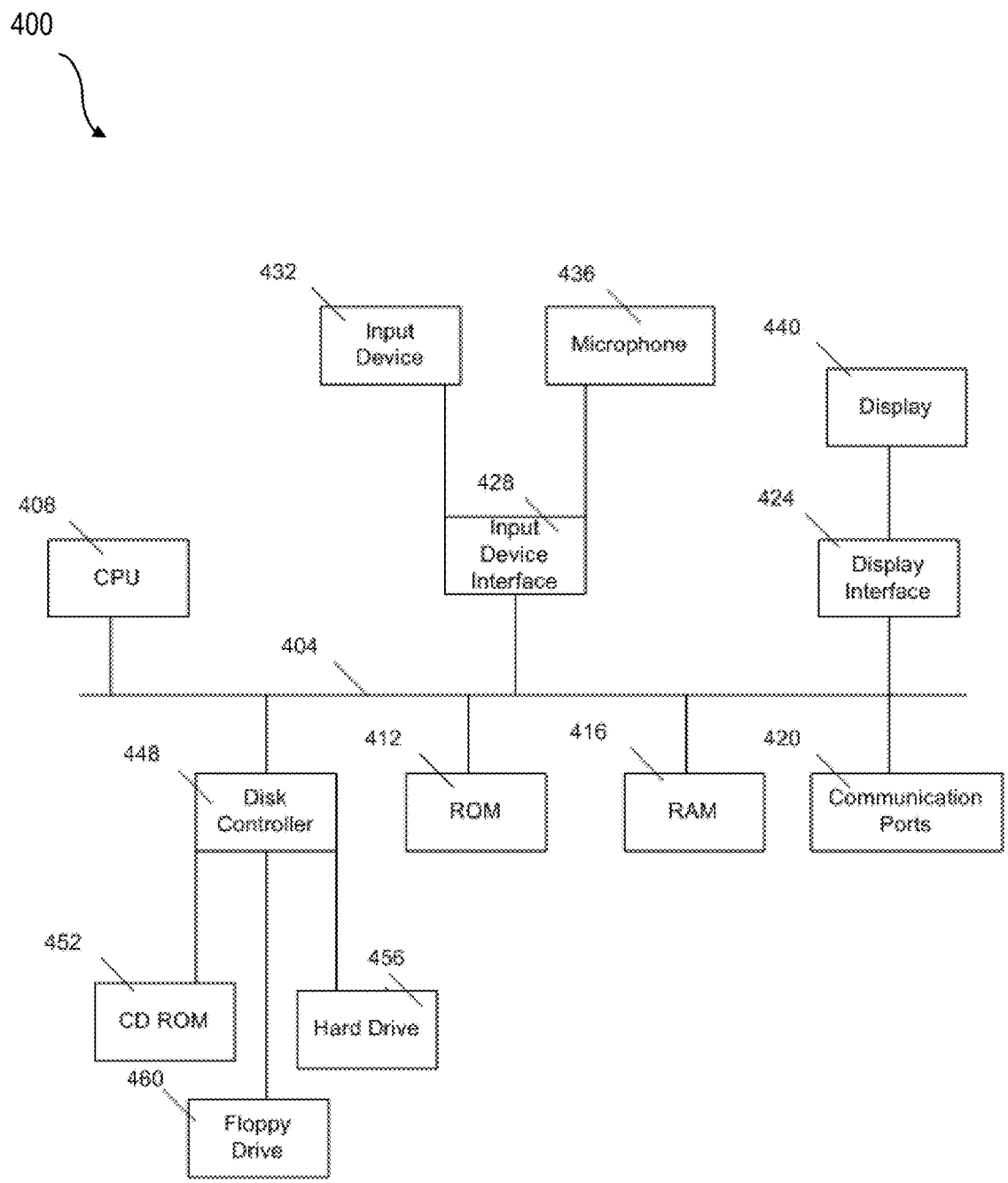
FIG. 4 is a diagram illustrating aspects of a computing node.

FIG. 4 is a diagram illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives may be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 436, or tactile feedback); and input from the user may be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of or" "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising: initiating, in a distributed computing environment having a plurality of nodes, execution of a plurality of application services corresponding to a plurality of user sessions; executing all functional units of each application service as part of a node of the distributed computing environment in a separate service environment and without remote calls to other services; executing each user session in a separate and distinct node of the distributed computing environment; and dynamically composing, by a special node forming part of the plurality of nodes, additional nodes to execute user sessions according to functional needs of a corresponding application and to workload, the composing comprising controlling consumption of resources by a node; wherein the distributed computing environment comprises: an in-memory database platform; a duster computing framework; and an in-memory query engine providing: selective access to the in-memory database platform and the duster computing framework; shared application services that are reusable across different application services; application specific services that are not reusable across different application services; and wherein the respective service environments provide access to service configurations for at least a portion of the services and provide direct access to interfaces of other services for inter-service interaction without a proxy.

2. The method of claim 1, wherein execution of the application services are orchestrated by an application server in communication with each of the plurality of nodes.

3. The method of claim 1, wherein at least a portion of the shared services and/or application specific services are obtained by the application server from a service registry.

4. The method of claim 1, wherein at least a portion of the application services are written in the GO programming language.

5. The method of claim 1, wherein the special node controls CPU, memory, or disk space to dynamically compose the additional nodes.

6. A system comprising: at least one data processor; and memory storing instructions which, when executed by the at least one data processor, result in operations comprising; initiating, in a distributed computing environment having a plurality of nodes, execution of a plurality of application services corresponding to a plurality of user sessions; executing all functional units of each application service as part of a node of the distributed computing environment in a separate service environment and without remote calls to other services; executing each user session in a separate and distinct node of the distributed computing environment; and dynamically composing, by a special node forming part of the plurality of nodes, additional nodes to execute user sessions according to functional needs of a corresponding application and to workload, the composing comprising controlling consumption of resources by a node; wherein the distributed computing environment comprises: an in-memory database platform; a cluster computing framework; and an in-memory query engine providing: selective access to the in-memory database platform and the cluster computing framework; shared application services that are reusable across different application services; and application specific services that are not reusable across different application services; and wherein the respective service environments provide access to service configurations for at least a portion of the services and provide direct access to interfaces of other services for inter-service interaction without a proxy.

7. The system of claim 6, wherein execution of the application services are orchestrated by an application server in communication with each of the plurality of nodes.

8. The system of claim 6, wherein at least a portion of the shared services and/or application specific services are obtained by the application server from a service registry.

9. The system of claim 6, wherein at least a portion of the application services are written in the GO programming language.

10. The system of claim 6, wherein the special node controls CPU, memory, or disk space to dynamically compose the additional nodes.

11. A non-transitory computer program product storing instructions which, when executed by at least one data processor forming part of at least one computing system, result in operations comprising: initiating, in a distributed computing environment having a plurality of nodes, execution of a plurality of application services corresponding to a plurality of user sessions; executing all functional units of each application service as part of a node of the distributed computing environment in a separate service environment and without remote calls to other services; and executing each user session in a separate and distinct node of the distributed computing environment; and dynamically composing, by a special node forming part at the plurality of nodes, additional nodes to execute user sessions according to functional needs at a corresponding application and to workload, the composing comprising controlling consumption of resources by a node; wherein the distributed computing environment comprises: an in-memory database platform; a cluster computing framework; and an in-memory query engine providing: selective access to the in-memory database platform and the cluster computing framework; shared application services that are reusable across different application services; and application specific services that are not reusable across different application services; and wherein the respective service environments provide access to service configurations for at least a portion of the services and provide direct access to interfaces of other services for inter-service interaction without a proxy.

12. The computer program product of claim 11, wherein execution of the application services are orchestrated by an application server in communication with each of the plurality of nodes.

13. The computer program product of claim 11, wherein at least a portion of the shared services and/or application specific services are obtained by the application server from a service registry.

14. The computer program product of claim 11, wherein at least a portion of the application services are written in the GO programming language.

15. The computer program product of claim 11, wherein the special node controls CPU, memory, or disk space to dynamically compose the additional nodes.

* * * * *